(12) United States Patent
Daou

(10) Patent No.: US 9,453,682 B2
(45) Date of Patent: Sep. 27, 2016

(54) STEEL PRODUCTION FACILITY

(76) Inventor: Rafic Boulos Daou, Bdadoun (LB)

( * ) Notice: Subject to any disclaimer, the term of this patent is extended or adjusted under 35 U.S.C. 154(b) by 806 days.

(21) Appl. No.: 13/257,411

(22) PCT Filed: Mar. 10, 2010

(86) PCT No.: PCT/IB2010/051022
§ 371 (c)(1),
(2), (4) Date: Sep. 19, 2011

(87) PCT Pub. No.: WO2010/106466
PCT Pub. Date: Sep. 23, 2010

(65) Prior Publication Data
US 2012/0006156 A1    Jan. 12, 2012

(30) Foreign Application Priority Data

Mar. 18, 2009   (DE) .................. 10 2009 001 646
Sep. 18, 2009   (DE) .................. 10 2009 029 617

(51) Int. Cl.
*C22B 21/00*    (2006.01)
*F27D 17/00*    (2006.01)
(Continued)

(52) U.S. Cl.
CPC .............. *F27D 17/004* (2013.01); *C21C 5/527* (2013.01); *C21C 5/5294* (2013.01); *F27B 3/085* (2013.01);
(Continued)

(58) Field of Classification Search
USPC ......... 266/142, 99, 78, 200, 242; 373/80, 78
See application file for complete search history.

(56) References Cited

U.S. PATENT DOCUMENTS 3,565,407 A    2/1971   Schermer et al.
4,543,124 A    9/1985   Vallomy
(Continued)

FOREIGN PATENT DOCUMENTS

CH    415 709    6/1966
DE    1 804 098    7/1969
(Continued)

OTHER PUBLICATIONS

Vallomy, "Energy and Environment make Constell the choice in USA and Japan", Steel Times International, Mar. 15, 1991, Redhill, Surrey, GB.
(Continued)

*Primary Examiner* — Scott Kastler
(74) *Attorney, Agent, or Firm* — Laurence A. Greenberg; Werner H. Stemer; Ralph E. Locher

(57) ABSTRACT

A steel production facility and a method of uninterrupted, or at least cyclical, steelmaking in the facility. In the case of uninterrupted steelmaking at least the first three of the following steps and in case of cyclical steelmaking all five steps are performed: charge materials are molten uninterruptedly or cyclically in an electric arc furnace; the charge materials (e.g., shredded scrap-iron pieces shredded in a shredding-system for shredding discarded iron and/or steel junk), Direct Reduced Iron and/or Hot Briquette Iron are uninterruptedly or continuously during a melting process cycle fed into the electric arc furnace; a part of liquid steel is uninterruptedly or cyclically discharged from the steel bath of the electric arc furnace; from the thermic energy included in the hot process-exhaust of the electric arc furnace, electric energy is, by means of power generation, generated uninterruptedly or at least during a melting process cycle; a shredding-system assigned to the electric arc furnace for shredding the scrap is powered by the electric energy generated from the process exhaust.

15 Claims, 5 Drawing Sheets

(51) Int. Cl.
  *C21C 5/52* (2006.01)
  *F27B 3/08* (2006.01)
  *F27B 3/18* (2006.01)
  *F27B 3/26* (2006.01)
(52) U.S. Cl.
  CPC . *F27B 3/18* (2013.01); *F27B 3/26* (2013.01); *C21C 2005/5282* (2013.01); *C21C 2200/00* (2013.01); *Y02P 10/216* (2015.11)

(56) References Cited

U.S. PATENT DOCUMENTS

| | | | |
|---|---|---|---|
| 4,551,172 A | 11/1985 | Formanek et al. | |
| 5,153,894 A | 10/1992 | Ehle et al. | |
| 5,221,512 A | 6/1993 | Sancinelli | |
| 5,902,372 A | 5/1999 | Ramaseder et al. | |
| 6,155,333 A | 12/2000 | Vallomy | |
| 2012/0006156 A1* | 1/2012 | Daou | 75/10.37 |

FOREIGN PATENT DOCUMENTS

| | | |
|---|---|---|
| DE | 1 927 558 | 8/1971 |
| DE | 690 27 302 T2 | 12/1996 |
| DE | 196 48 306 A1 | 6/1997 |
| DE | 10 2009 001 646 B3 | 7/2010 |
| DE | 10 2010 002 523 A1 | 9/2010 |
| EP | 0 139 310 A1 | 5/1985 |
| EP | 0 219 824 A1 | 4/1987 |
| EP | 0 385 434 A2 | 9/1990 |
| EP | 0 451 323 A2 | 10/1991 |
| GB | 958 731 A | 5/1964 |
| GB | 1 241 715 A | 8/1971 |
| WO | 00/50648 A1 | 8/2000 |
| WO | 2009/095942 A1 | 8/2009 |

OTHER PUBLICATIONS

Webpage "Stalhwerk Marienhütte", automatic English translation.
Webpage "Stalhwerk Marienhütte", original Austrian version.
Vallomy, "Retrofitting of the Consteel process at ORI Martin SpA of Brescia", La Revue de Metallurgie-CIT, Apr. 2000, pp. 515-525.
Vallomy, et al., "The Consteel Process: An integral scrap preheater for the EAF", Steel Times, May 1993, pp. 221, 223.

* cited by examiner

STEEL PRODUCTION FACILITY

BACKGROUND OF THE INVENTION

1. Field of the Invention

The present invention relates to a steel production facility and a method of uninterrupted or at least cyclical steelmaking in said facility, at the least comprising an electric arc furnace (EAF) for uninterruptedly or at least cyclically melting charge materials like shredded scrap-iron pieces in particular.

2. State of the Art

Steel can on the one hand be made from iron ore and pig-iron via the route of blast furnace and converter. However, with respect to energy efficiency, it is on the other hand more advantageous to produce steel mainly by melting pieces of scrap-iron in the electric arc furnace, which is still the most used charge material worldwide for electric arc furnaces.

Steelmaking in the Electric Arc Furnace (EAF):

In the common electric arc furnace process, electrical and chemical energy is used for cyclically melting the charge material. During this process, a huge part of the total energy is transformed into thermic energy that entails the melting of the inserted material. The heat above the electric arc, which burns between the electrode and the charge material, is transferred to the charge material mainly by radiation.

As in every melting process, an oxidic mass is produced in this process, the slag, which due to its lower specific weight floats on top of the molten steel and to which are transferred the unwanted secondary elements separated from the molten material.

A cyclically melting process nowadays normally takes between 30 and 60 minutes (depending on the transformer and the charge material). After the melting process there follows the so-called tapping, which means that the liquid steel is tapped into a steel ladle and in the course of the secondary metallurgy, is refined and cast with further alloy additions according to the customers' demands. The time between two steel taps is in the following defined as cycle of a melting process.

For the purity degree of the steel and its casting quality it is important, that during the tapping into the ladle as little slag as possible or no slag flows along with it. In order to avoid that, it has been common practice to this day, at first and before the tapping of the fluent steel, to discharge the slag out of the furnace into a slag bucket and to cast the molten steel separately thereof into the ladle.

Older electric arc furnaces are designed to provide, for the separate discharge of slag and steel, two openings arranged at the furnace wall at opposite sides and on different levels, which openings can usually be closed and controlled by means of a plug system or in a more modern way by means of a slide system. For the purpose of a reliably separated discharge of slag and steel, the complete furnace was pivoted to the respective opening for discharge, which means, at first to a slag off position between 10° and 15° towards the slag discharge opening arranged on a higher level and then, to a tapping position of circa 45° towards the steel tap opening arranged on a lower level.

In order to make it possible to at least partially reduce or simplify demanding pivoting mechanisms for the furnace, it was suggested to reposition the steel tap opening from the lateral wall of the furnace to the bottom of the furnace. Like in all cases of flowing in and flowing off below a liquid surface, there can occur vortexes, which due to their circular or spiral downward movement may have the unwanted effect of dragging along pieces of slag.

To avoid that, it is commonly known that a certain rest of slag and/or a certain steel sump, remains as minimal quantity (circa 15% of the volume of the furnace) in the furnace, which quantity is at the same time conducive to the undisturbed continuation of the cyclically following melting reduction.

Since then, it has become a common feature of modern electric arc furnaces, that the steel tap opening is arranged at the bottom of the furnace between the center of the furnace and the wall of the furnace. The so-called eccentric bottom tapping (EBT) has the effect, that the furnace now needs to be inclined a few degrees only (up to 15° degree maximum), that means, at first, for the discharge of the slag, towards the slag discharge opening still arranged at the wall of the furnace, and then, for the tapping of the liquid steel, towards the steel tab opening eccentrically arranged at the bottom of the furnace. This implies advantages with regard to the volume and the cooling of the furnace. Moreover, the problem of slag running along is reduced by this type of steel tapping.

If—as it is usually the case with modern electric arc furnaces—during the melting process, especially by means of so-called refining lances, there is added oxygen ("refining") and carbon, at the surface of most steel types emerges a slag foam, which mainly consists of enclosed gases.

Even foam slags can be slagged off in the classical way. However, it is very common practice, to arrange the slag discharge opening at a level of height related to the melting bath which is defined or definable by a slide system, in such a way that an overrun of foam slag can drain off according to the overflow principle, thus after exceeding a capacity limit, as soon as the melting bath has reached a certain level, whereby breaks caused by slagging off during the melting process are advantageously avoided, at the end of which the classical steel tapping via EBT takes place again.

For the purpose of reaching a productivity as high as possible for the electric arc furnace, it has been always attempted up to now to melt as quick as possible, to add as much electric energy as possible during the entire melting period and to make breaks or in-between intervals without energy supply as short as possible. This is, because the shorter the interval between two tapping processes is, the more flexible is the steel mill regarding its producing structure. Contributing to this are, among other things, also the 800 mm electrodes which were put on the market a few years ago, which allow higher intensities of current and faster tappings. Thus, in modern electric arc furnaces, an electric arc with an intensity of up to 140.000 Ampere makes up to 200 tons of steel scrap melt. At the electric arc furnace there are temperatures of up to 3.500° C. and in the steel bath of up to 1.800° C.

Slag off and tapping off periods up to this day however lead to the typical, cyclical breaks in the supply of electricity, charge materials and additives like fine-grained solid materials and therefore cause the typical, discontinuous process-run of an electric arc furnace.

Feeding of Electric Arc Furnaces (EAF):

Scrap-iron, as a recovered raw material, is available in many different shapes and configurations. According to its properties and to the demands of the melting process and the desired steel qualities, the discarded iron and/or steel junk (scrap) undergoes different measures of preparations. The price of scrap-iron is changing frequently not only due to the market situation, but also due to the final physical and chemical properties of scrap-iron.

In steelmaking the charge material is selected in accordance with the final product which is to be produced. For simple steel grades normally the cheapest scrap-iron is used. This scrap-iron is usually discarded prepared iron and/or steel junk (scrap). The density of this scrap-iron is normally less than 0.4 kg/dm3. Three to four scrap-baskets are normally needed to charge the furnace-shell of an ordinary electric arc furnace. When, as necessary for this, the furnace-roof is opened by pivoting for charging the furnace-shell, energy losses between 15 to 20 kWh/t of steel have to be expected. The interruption of the melting process by normally 4 to 7 or more minutes per each tapping off of slag and steel plus charging with scrap-baskets reduces the productivity and increases the electrode consumption due to additional oxidation of electrodes.

To increase the density of the charge material it is well-known to press the scrap-iron. After pressing the scrap-iron into bundles the density is increased and consequently fewer scrap-baskets have to be charged. However, the melting process has still to be interrupted for the charging.

However, it is only the initial charging of scrap-iron, as the case may be, with Direct Reduced Iron (DRI) and/or Hot Briquette Iron (HBI) and slag formers into the electric arc furnace, which creates the conditions for melting those charge materials and for forming a molten metal bath, which is covered by molten slag.

Recovery of Heat and Energy (Generally):

The possible air pollution by gaseous and dust-laden substances is considered the most essential environmental problem implied in steelmaking from primary raw materials (mostly ores or pellets made from ores). The metallurgical processes are potential sources for the emission of dust and metals from furnaces, converters and from the transport of molten metals.

Furthermore, the energy consumption and the recovery of heat and energy are important aspects of the production of iron metals and steel. They depend on the efficient use of the energy included in ores and admixtures, on the energy demand of the process levels, on the type of energy that is used and on the method of energy supply as well as on the use of efficient methods for heat recovery.

Thus, for the route of furnace and converter was suggested (see GB 958731 A=CH 415 709 B) to, directly or indirectly via a steam production device, feed a turbine with process-exhaust, which turbine powers a generator, the energy of which is used for powering turbo blowers or cowpers of the blast furnace.

Elsewhere it was suggested to use the power generated in particular indirectly via a steam production device from the process-exhaust of a rotary furnace for predrying brown coal (see. GB 1241715 A=DE 19 27 558 A1), for producing oxygen, for feeding the power grid or for powering so-called submerged arc furnaces (see U.S. Pat. No. 4,551,172 A=EP 0 139 310 A1), however, submerged arc furnaces are not used for steel production but for the reduction of slag in order to recover metallic components.

Recovery of Heat and Energy (by EAF):

During the production of steel from secondary raw materials like scrap-iron in the electric arc furnace, gaseous and dust-laded substances are emitted as well; and thus the most essential environmental problems are related to the emissions as well.

Well-known among the methods for heat recovery from the hot process-exhaust (furnace top) of an electric arc furnace is particularly the use of exhaust for drying and preheating of charges (see for example U.S. Pat. No. 3,565,407 A=DE 18 04 098 A1 as well as U.S. Pat. No. 5,153,894 A=EP 0 385 434 B1). There has been, however, no further use of this heat to this day. Efficient dedusting plants and filters are therefore necessary.

Recovery of Electrical Energy (by EAF):

An electrical power recovery before or after the cleaning of process-exhaust (furnace top) is also possible in most cases of electric arc furnaces, but the local situation is very important, like e.g. if the electric arc furnace is operated in mini-mills (compact-mill) and foundries and there is no possibility to use the recovered energy other than to feed it into the national power grid, which is already subject to the danger of unwanted system perturbations resulting from the procedurally determined irregular burning of an electric arc. Therefore, there are always high demands on the power supply of an electric arc furnace.

As electric arc furnaces however have so far functioned as fed-batch-process, which means that they are cyclically fed with batches of application materials like pieces of scrap-iron, Direct Reduced Iron (DRI) and/or compressed Hot Briquette Iron (HBI), the temperature of the process-exhaust undergoes cyclical changes. To compensate for that, in the context of a case study of the ZERO EMISSIONS RESEARCH IN AUSTRIA (ZERIA), an initiative on behalf of the Federal Ministry of Transport, Innovation and Technology (BMVIT) and of the WIFI of Austria (see http://zeria.tugraz.at/index.php3?lang=de&sel=09Fallstudien/01Marienhütte) it is suggested for the steel mill "Marienhütte" to control the exhaust temperature by means of an additional gas burner. For this, complex means of measurement and control have to be provided. Moreover, the use of gas burners for stabilization of the exhaust temperature has the disadvantage of additional use of primary energies and of costs implied therein.

SUMMARY OF THE INVENTION

On this basis, the present invention is based on the task to provide, in respect of productivity compared to the state of the art, an improved facility for steel production comprising an electric arc furnace. Thus, such electric arc furnace of the steel production facility should burn more evenly and should be able to be powered without using additional gas burners and should have exhaust temperatures which are stable at least over large periods of the cycle of a melting process and therefore more economic as well as they can be operated more free of system perturbation for the local power grid. In particular, however, the aim is to improve the productivity of a steel production facility in such a way that cyclical intervals of interruption are avoided.

This task is solved by a steel production facility as claimed. Advantageous constructions and further developments, which can be applied separately or in combination with each other, are set forth in the appended claims.

With the foregoing and other objects in view there is provided, in accordance with the invention, a steel production facility, which at the least comprises an electric arc furnace for at least cyclically melting of charge materials like shredded scrap-iron pieces in particular and which is characterized by:

means of at least cyclical power generation during the melting from the thermic energy included in the hot process-exhaust (furnace top) of the electric arc furnace;
a shredding-system assigned to the electric arc furnace for shredding discarded iron and/or steel junk (scrap), which can be powered at least during a melting process cycle by electric energy recovered by the power generation means; and means of conveyance, by means of which, during a melting process cycle, the electric arc furnace can be continuously fed at least with the pieces of scrap-iron shredded by the shredder-system.

As to the electric arc furnace is assigned a shredding-system for shredding discarded iron and/or steel junk (scrap), it is possible for the first time to feed the scrap-iron pieces shredded in the shredding-system loosely in bulk, thus without having to be pressed before, and continuously at least during a melting process cycle, to the electric arc furnace.

By continuously feeding the electric arc furnace with non-pressed, shredded scrap-iron pieces loosely in bulk, the electric arc can burn much more steadily during a melting process cycle than in the usual case of batch-wise feeding an electric arc furnace with scrap-iron etc., and this has the advantage that unwanted system perturbations are avoided. Furthermore there continuously arises at least during a melting process cycle a process-exhaust (furnace top) of nearly equal character and quality, which serves the aimed purpose of continuous power generation at least to such an extent as is needed at least during a melting process cycle for powering a shredding-system assigned to the electric arc furnace. As gas burners for process-exhaust regulation and an external power supply for the shredding-system are no longer used, the steel production facility according to the invention operates on a, from an economic point of view, so far unmatched level with regard to energy balance. Thus, by the steadier burning of electric arcs, the productivity of the electric arc furnace can be increased by more than 19%, and energy costs of about 14% can be saved, wherein at the same time emissions to the atmosphere are drastically reduced.

Due to the fact that the electric arc furnace, at least during a melting process cycle, is continuously fed with shredded pieces of scrap-iron and, as the case may be, others charge materials, it can, in a preferred embodiment of the invention as claimed, be made of a furnace-shell made from refractory material and/or comprising water cooled elements and a furnace-roof always closed during the continuous feeding with scrap-iron pieces, wherein there is arranged at a wall of the furnace shell and/or at the furnace roof a feeding opening, which allows to continuously feed the electric arc furnace with the pieces of scrap-iron shredded by the shredding system, without having to open the furnace-roof for this, as it has been usual so far only for additives like coke, lime and limestone and normal practice in such steel plants solely working with Direct Reduced Iron (DRI) or Hot Briquette Iron (HBI), and which avoids not only long feeding time but also huge heat losses, in contrast to the known electric arc furnaces that have to be charged with scrap-baskets via an opened furnace-roof.

In the state of the art, the process of charging pieces of scrap-iron with scrap-baskets has to be repeated several times, depending on the material to be used (required metallic input). For each charging cycle the electrical energy has to be interrupted, the electrodes raised and the furnace-roof swiveled out. A charging time of 4 to 7 minutes is normally scheduled for modern electric arc furnaces.

It is proven that the elimination of these interruptions for recharging will result not only in shorter heat time but also in reduced energy consumption per ton of steel produced, as, by opening the furnace-roof, a considerable amount of precious heat is lost from the electric arc furnace due to radiation and convection.

After charging, the heat losses must again be added by electrical energy, particularly when using light or non-compacted iron junk, because the number of scrap-baskets to be charged will increase.

Another negative effect during scrap charging via scrap-baskets is the high emission of dust and smoke to the environment while the furnace-roof is swiveled out.

Contrary to that, after elimination of feeding with baskets, the furnace-roof never has to be swiveled out during operation so that advantageously neither any losses of time nor of energy are caused by heat radiation. The necessity to swivel out the furnace-roof is therefore only given for purposes of repair.

For this, however, there is no need of a complex roof lifting device, which can be entirely eliminated, as the roof can be lifted by the overhead crane whenever required for purpose of repairing or changing.

The electric arc furnace may—as it is common according to the state-of-the-art—comprise a furnace-shell dimensioned in such a way, that inside there is enough room for the maximum amount of shredded scrap-iron pieces in unmelted form that can be molten in the course of one cycle of a melting process, so that advantageously even already existing electric arc furnaces can be part of a steel production facility according to the invention.

As far as an electric arc furnace will be newly constructed, it is preferred by the present invention, that the electric arc furnace comprises a furnace-shell dimensioned in such a way, that there is enough room for 90% only, especially for 80% only, preferably for 70% only of the maximum amount of shredded scrap-iron pieces that can be molten in the course of one cycle of a melting process.

Due to the fact that during a melting process cycle, the electric arc furnace is continuously fed with shredded pieces of scrap-iron and, as the case may be, with other charge materials, the furnace shell, in a preferred embodiment of the invention can sometimes be dimensioned significantly smaller than in the case of batchwise feeding as according to the state-of-the-art.

The smaller a furnace shell can be dimensioned, the less it needs to be cooled.

Therefore and as the electric arc can burn far more steadily due to the continuous feeding of the charge materials, it is possible to construct furnace shells which are solely made of refractory material and do not need wall cooling elements at all.

The possibility of replacing the water cooled panels by refractory material significantly reduces the extent of the water treatment plant (WTP) and leads to additional savings of electrical energy of about 5%, which is of particular interest to countries, where water is scarce and expensive.

In accordance with an added feature of the invention according to claim 4, the electric arc furnace preferentially comprises means for creating foamy slag in such an amount that the arcs are at least partially muffled by foamed slag layer.

Exposed electric arcs cause an increased wastage of electrodes and an unwanted heating of the furnace walls. Further consequences are a reduced energy efficiency, longer process times and therefore reduced productivity. In order to muffle the electric arc there is generated a foam slag which can be controlled in its height by specifically adding coal fines and oxygen. The feeding of these foaming agents is carried out either manually or automatically according to a predefined control diagram by the portioned blowing in into the boundary layer existing between the slag layer and the molten metal and/or into the zones of the slag layer and/or of the molten metal that are adjacent to the boundary layer.

In the past it was difficult to charge light material like shredded scrap-iron pieces with a preferred length in any direction in space of e.g. 30 cm maximum to the steel bath through the slag, particularly because the slag was too hard and the material had to be charged between the electrodes. Nowadays, with the foamy slag practice, which blows more carbon and oxygen into the liquid steel, in order to foam the slag, this problem has been solved.

Even the foam slag process itself named after the type of slag has many advantages: The needed quantity of energy is reduced by 5% maximum due to the thermal shield of the foam slag, the formation of the electric arc is supported, the abrasion of the electrodes and of the fireproof material of the furnace-shell diminished, the periods of tapping are shortened and the application of alloying elements, like in particular chrome, is improved.

In accordance with an added feature of the present invention according to claim 5, the electric arc furnace comprises a slag discharge opening arranged at the furnace wall of the furnace shell, in such a way, that it is located at a level of height which is defined or definable, in relation to the melting bath, by a slide or plug system, in such a way that an overrun of foamy slag can drain off according to the overflow principle, as soon as the melting bath has reached a certain level, whereby breaks caused by slagging off during the melting process are advantageously avoided.

An electric arc furnace in accordance with the present invention can preferably be constructed in such a way that a steel tapping follows after each cycle of a melting process, so that advantageously even already existing electric arc furnaces can be part of a steel production facility according to the invention.

With the foregoing and other objects in view however there is provided, in accordance with the invention, a steel production facility, which, being based on well-known steel production facilities, is characterized by an electric arc furnace made for uninterruptedly melting charge materials like in particular shredded scrap-iron pieces, Direct Reduced Iron (DRI) and/or Hot Briquette Iron (HBI), wherein a part of liquid steel can be uninterruptedly discharged from the steel bath of the electric arc furnace via a steel tap opening arranged at or near the bottom of the furnace, and the charge materials can be uninterruptedly charged via conveying devices to the electric arc furnace, so that advantageously an uninterrupted melting process is given.

As the electric arc furnace comprises a steel tap opening which allows an uninterrupted steel discharge, there can be, in combination with an uninterrupted feeding of charge materials to the electric arc furnace, induced and sustained an uninterrupted melting process.

Possible charge materials can be in particular shredded scrap-iron pieces, Direct Reduced Iron (DRI) and/or pressed Hot Briquette Iron (HBI). The shredded scrap iron pieces can, preferentially according to the invention, come from a shredding-system assigned to the electric arc furnace for shredding discarded iron and/or steel junk (scrap); or alternatively or cumulatively they are delivered to the electric arc furnace in such pre-processed form already.

As far as to the electric arc furnace is assigned a shredding facility, it is preferred that means for power generation during the melting process come from the thermal energy implied in the hot process-exhaust (furnace top) of the electric arc furnace, by which the shredding-system can be driven.

By uninterruptedly discharging a part of the steel from the steel bath and by uninterruptedly feeding the electric arc furnace with charge materials loosely in bulk like non-pressed shredded scrap-iron pieces, Direct Reduced Iron (DRI) and/or Hot Briquette Iron (HBI), the electric arc can burn more or less always constantly during the continuing melting process.

Interruptions like in the usual case of feeding an electric arc furnace batch-wise with scrap-iron etc. and cyclical tappings are entirely avoided, whereby advantageously unwanted system perturbations are eliminated.

Furthermore, there uninterruptedly arises a process-exhaust (furnace top) of consistent character and quality, which allows an uninterrupted power generation to such an extent as it is unmatched up to now for steel production facilities.

As gas burners for process-exhaust regulation and an external power supply for a shredding-system are no longer used, the steel production facility according to the invention finally operates on a, from an economic point of view, so far unmatched level with regard to energy balance. Thus, by the uninterrupted burning of electric arcs, the productivity of the electric arc furnace can be increased by more than 26%, and energy costs can be reduced by about 23%, wherein at the same time emissions to the atmosphere are drastically reduced.

In another preferred embodiment of the invention, the part of liquid steel will be discharged from the steel bath into a steel ladle, which is equipped at its rim with a spout, which overlaps the rim of a neighbouring steel ladle, to guaranty a trouble free exchange of the ladle under the continuous steel stream.

In accordance with an added feature of the invention, the steel production facility advantageously comprises a computer based process control system, which makes it possible, to direct unrestrictedly definable feed rates, especially of scrap-iron pieces, in such a way, that the charged materials are in balance with the needed melting energy, which advantageously allows the production of different steel types.

Thus, each material requires certain energy, called enthalpy, to melt. With modern computer techniques on the activity-level "automation" and on the activity-level "process control" it is possible to develop a melting profile for different scenarios of furnace charging. Computer based scenarios can especially choose the solely continuous charging of shredded scrap-iron pieces up to the continuous feeding of mixed charge materials of scrap-iron, DRI and/or HBI. In any case the furnace-roof will never be opened during the process, with significant reduction of expensive energy losses and emissions to the atmosphere. The feed rate will be selected in accordance with the power input which is controlled by the specific feed rate. The predicted temperature, calculated via the activity-level "process control", will be in that range that offers the best conditions for the foamy slag practice. The melting profile is developed in such a way that in case of a cyclically operated electric arc furnace the charging stops when the tapping temperature is reached. In this case no more refining time is required.

There is also the possibility to feed different charge materials at the same time, e.g. Direct Reduced Iron (DRI) and/or pressed Hot Briquette Iron (HBI), from another hopper. This material has a different enthalpy and therefore requires a different feed rate. However, via the activity-level "process control" each change within the feed mix can be calculated and controlled.

Not only in this context has it proved, in accordance with an added feature of the invention, to be advantageous, for detecting the actual feed rate of scrap-iron pieces, to assign at least one weighing device to the means of conveyance.

Likewise it has proved, in accordance with an added feature of the invention, to be advantageous in order to avoid interruptions of the melting process, to assign to the means of conveyance a segregation apparatus, which detects and segregates, particularly with optical methods, e.g. by means of monitoring cameras, pieces of scrap-iron that, depending on the overall size of the electric arc furnace, exceed pre-defined dimensions.

In accordance with an added feature of the invention, the electric energy itself generated for powering the shredding-system can be gained directly or indirectly, particularly by a recuperative boiler, from the thermic energy contained in the hot process-exhaust of the electric arc furnace.

Within the context of the present invention as claimed, a conventional alternating current electric arc furnace (AC) or as well a direct current electric arc furnace (DC) can be used.

The present invention furthermore relates to a method of uninterrupted or at least cyclical steelmaking in a facility according to one of the preceding claims, wherein in case of uninterrupted steelmaking at least the first three of the following steps and in case of cyclical steelmaking all five steps will be used:
- charge materials are molten uninterruptedly or at least cyclically in an electric arc furnace (10);
- the charge materials like in particular shredded scrap-iron pieces shredded in a shredding-system for shredding discarded iron and/or steel junk (scrap), Direct Reduced Iron (DRI) and/or Hot Briquette Iron (HBI) are uninterruptedly or at least continuously during a melting process cycle fed into the electric arc furnace by means of conveyance;
- a part of liquid steel is uninterruptedly or cyclically discharged from the steel bath of the electric arc furnace;
- from the thermic energy included in the hot process-exhaust (furnace top) of the electric arc furnace, electric energy is, by means of power generation, generated uninterruptedly or at least during a melting process cycle;
- a shredding-system assigned to the electric arc furnace for shredding discarded iron and/or steel junk (scrap) is powered uninterruptedly or at least during a melting process cycle by the electric energy generated from the process exhaust (furnace top).

Last but not least, the present invention relates to a method of using the electric energy gained by means of power generation devices from thermic energy included in the hot process-exhaust of an electric arc furnace that uninterruptedly or at least cyclically melts charge materials like shredded scrap-iron pieces in particular, for powering a shredding-system uninterruptedly or at least during the cycle of a melting process which, attached to the electric arc furnace shreds discarded iron and/or steel junk (scrap) in a steel production facility like described before or in the following.

The construction of the invention, however, together with additional objects and corresponding advantages will be best understood from the following description of specific embodiments and in connection with the accompanying drawings.

DESCRIPTION OF THE PREFERRED EMBODIMENTS

In the following description of the preferred embodiments of the present invention, similar identical reference numbers designate identical or com-parable components.

Figure 1:
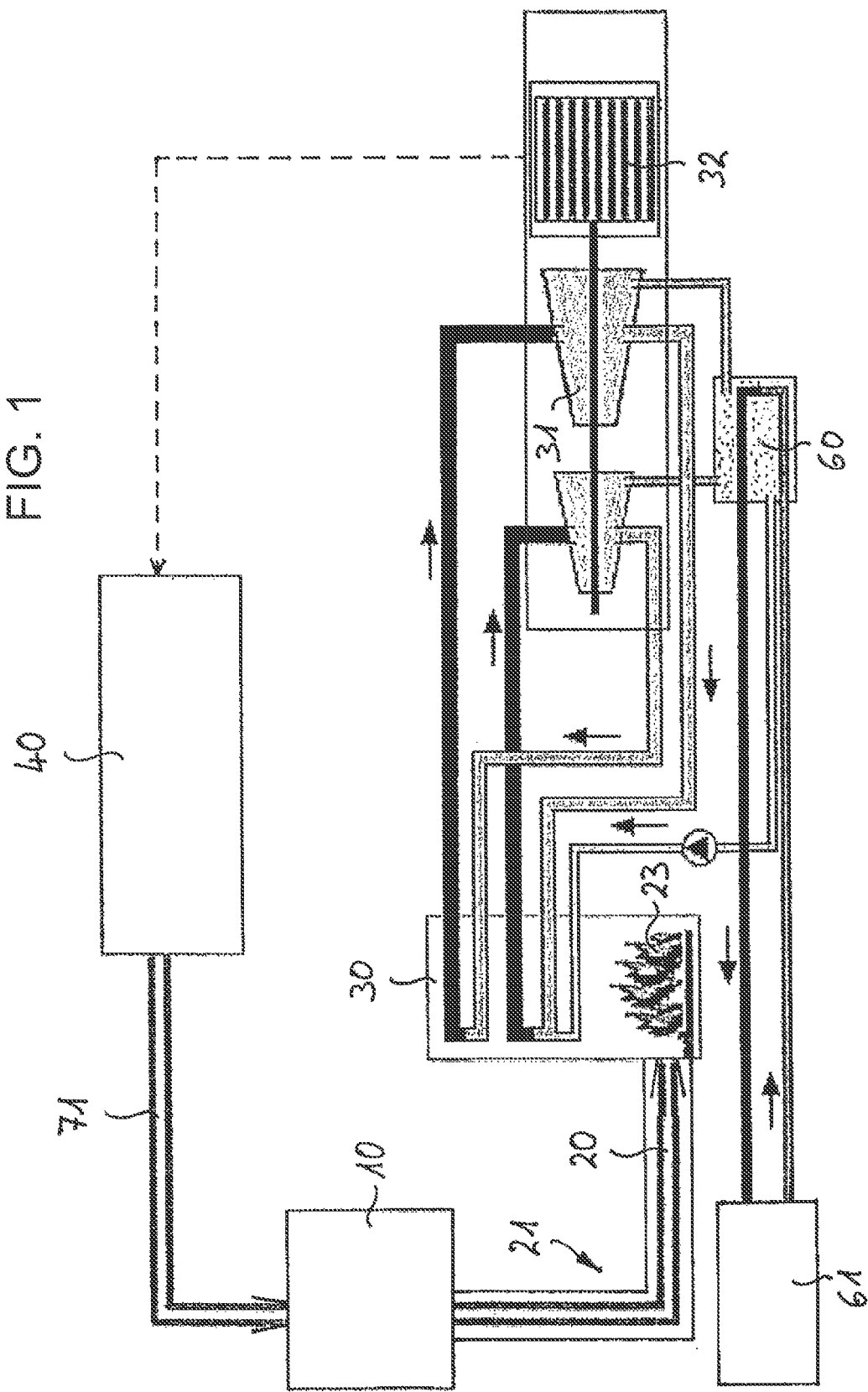
FIG. 1 exemplarily shows a possible embodiment of the means for electricity generation from the hot process-exhaust (furnace top) of an electric arc furnace, used for actuating a shredding-system attached to said electric arc furnace (EAF)

Referring now to the FIGS. 1 to 6 of the drawings in detail and first to FIG. 1 thereof, there is exemplarily shown a possible embodiment of means of power generation by using the thermic energy included in the hot process-exhaust (furnace top) 20 of the electric arc furnace 10 of a steel production facility, used for operating a shredding-system 40 attached to said electric arc furnace (EAF) 10.

For this, there is at least one recuperative boiler 30 installed in the exhaust gas system 21 of the dedusting plant 24 of the electric arc furnace 10. The recuperative boiler 30 can be located particularly in the outlet of a drop-out-box 22 for dust particles contained in the exhaust 20 and/or in an area 23 of the exhaust gas system 21 with post combustion of carbon or in a subordinated way to the preceding facility 22/area 23. While the process-exhaust (furnace top) 20 of a steel production facility 1 enters the exhaust drain 21 with a constant temperature in the range between 900° C. and 1.100° C. without using additional gas burners, the exhaust temperature—as far as it has cooled down to below 800° C.—can newly be raised by transforming, due to addition of oxygen O, in an exothermic process, the toxic carbon CO with oxygen O into the less dangerous carbon dioxide $CO_2$, wherein this process generates temperatures up to about 1.670° C., which can be used for an effective steam generation.

As schematically illustrated in FIG. 1, there is also the possibility of clever arrangement of several recuperative boilers 30 in the exhaust gas system 21 of the dedusting plant 24, so that water 62, which e.g. is supplied by a water treatment plant 61, can be transformed into steam in a more effective way.

The steam generated by the recuperative boiler 30 powers a steam turbine 31, which powers a power generator 32.

The condensate generated by the turbine 31 is further on cooled by a condenser 60 and directly pumped into the water treatment plant 61.

With the electric energy gained from the power generation devices 30, 31, 32, it is possible to operate, without using a public power grid and therefore economically advantageously, the shredding-system 40 and possibly further consumer loads of the steel production facility 1.

Figure 2:
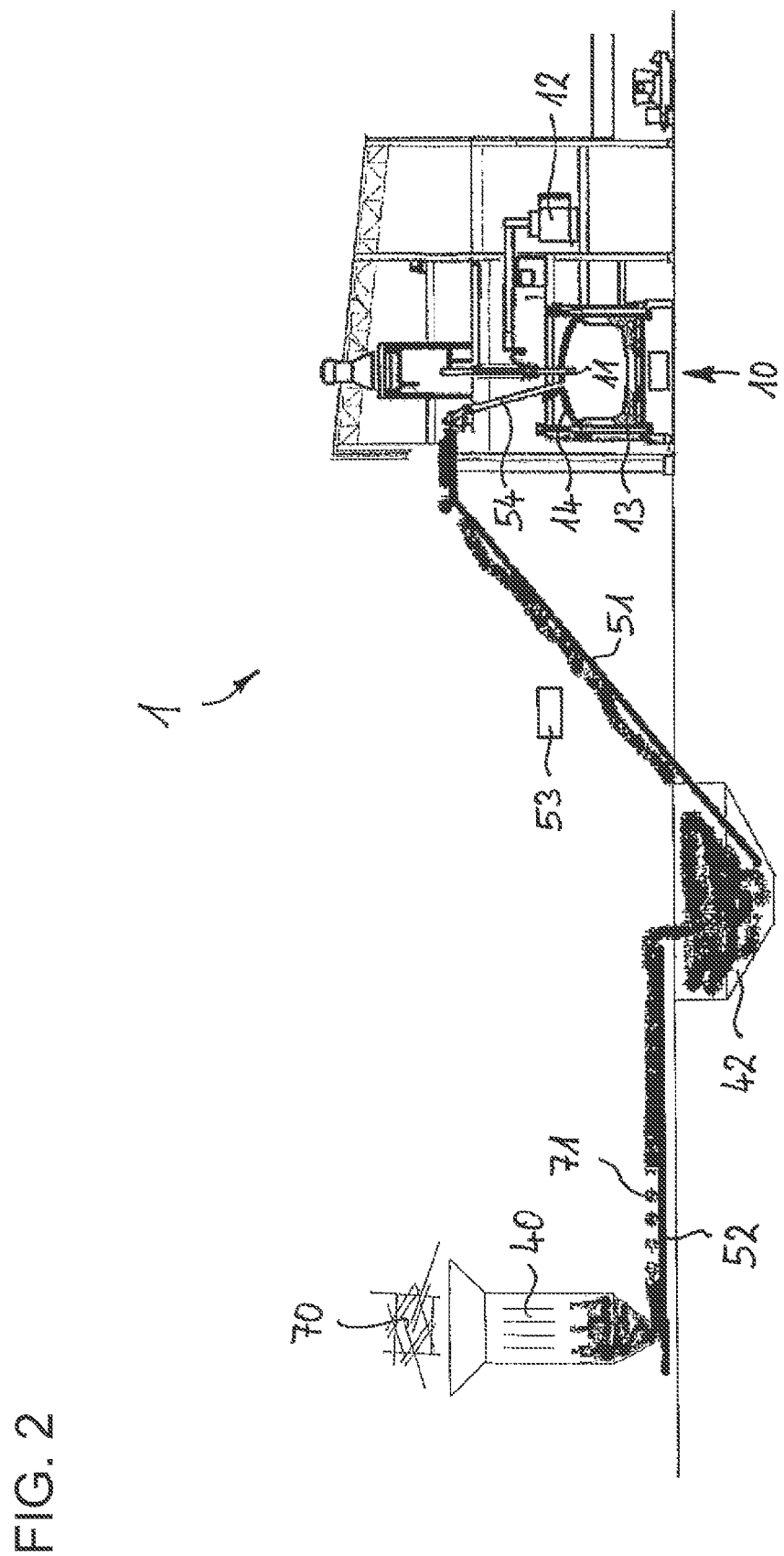
FIG. 2 exemplarily shows means of conveyance, which, uninterruptedly or at least continuously during the cycle of a melting process, transport for example the scrap-iron pieces, shredded in a shredding-system, to the electric arc furnace.

FIG. 2 exemplarily shows means of conveyance, which transport for example the scrap-iron pieces 71 shredded in a shredding-system 40 to the electric arc furnace 10 uninterruptedly or at least continuously during the cycle of a melting process.

Discarded iron and/or steel junk (scrap) 70 of various sizes is fed into a shredding system 40, which is—as illustrated—preferably assigned to the electric arc furnace 10.

The shredding-system 40 delivers shredded pieces of scrap-iron 71 of essentially equal size. Moreover, high value non-ferrous metals 72 can be segregated for further commercialization.

The shredded scrap-iron pieces 71 are transported loosely in bulk and non-pressed to the scrap-hopper 42, which also can be located in the underground.

One or more vibrating feeders 50 control the quantity of shredded scrap-iron pieces 71, which are fed into the electric arc furnace 10.

Furthermore, a first weighing system 52 fine-tunes the quantities.

The vibrating feeders 50 transport the shredded scrap-iron pieces 71 loosely in bulk and non-pressed via conveyor belts 51 and a preferably swivelling chute 54 located above the furnace-roof 14, to the furnace-shell 13 of the electric arc furnace 10.

Hence, the swivelling chute 54 delivers uninterruptedly or at least continuously during the cycle of a melting process shredded scrap-iron pieces 71 to the electric arc furnace 10.

An electric arc furnace 10 according to the invention, which is uninterruptedly or at least during the cycle of a melting process continuously fed with shredded scrap-iron pieces 71, operates with significantly lower specific energy consumption and higher productivity.

At the same time, the emissions to the atmosphere are significantly reduced as the furnace-roof 14 of the furnace-shell 13 has no longer to be opened in order to charge scrap-buckets of scrap-iron pieces.

Moreover, the dedusting plant 24 also works with significantly lower energy consumption as a secondary system is no longer necessary.

Figure 3:
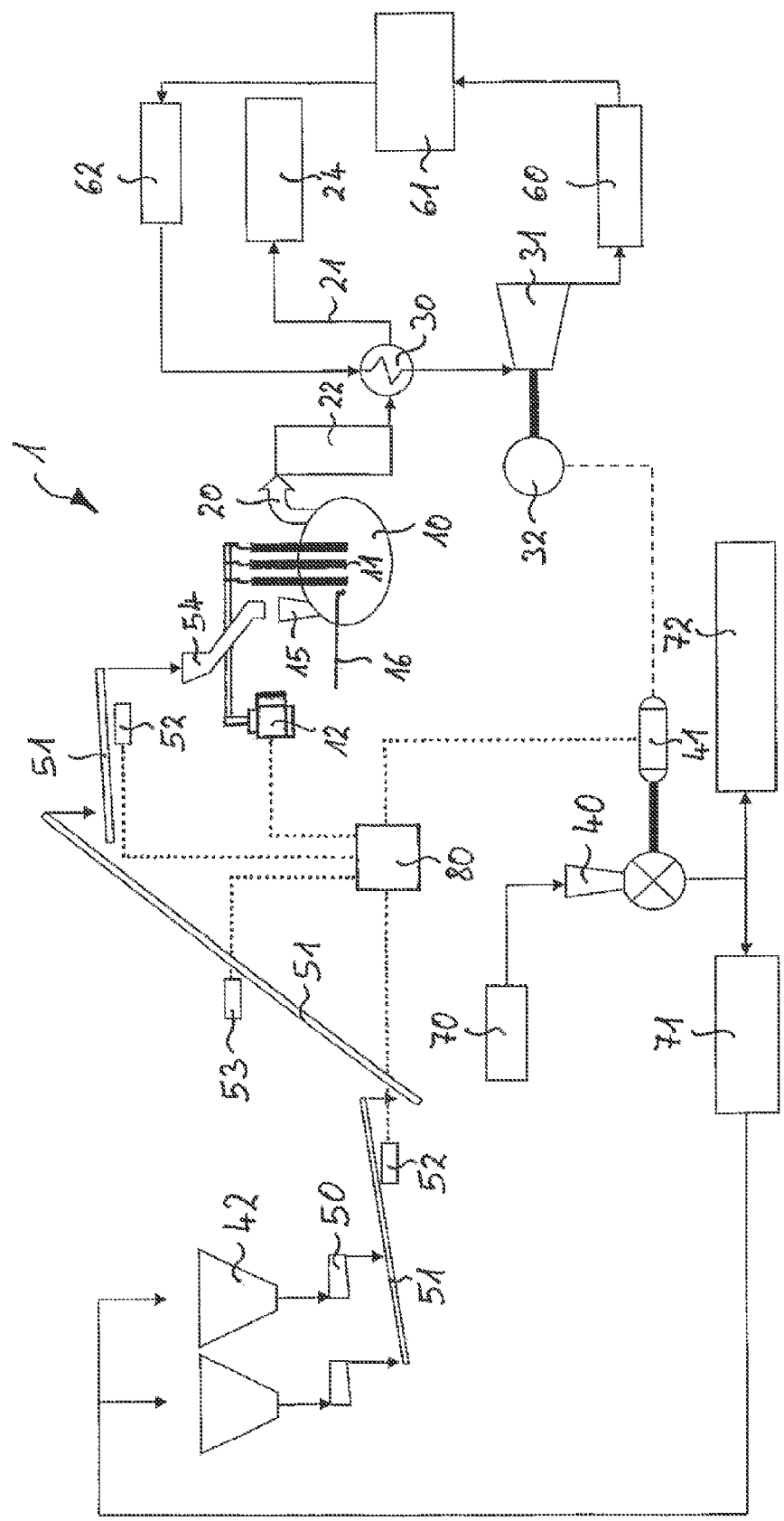
FIG. 3 shows the process flow of a first steel production facility according to claim 1 of the invention with cyclical melting processes, thus with alternating melting and tapping intervals.

On the basis of FIG. 3, the process cycle of a first steel production facility 1 according to claim 1 of the invention with cyclical melting processes, thus with alternating melting and tapping intervals is described in more detail now.

The shredding-system 40 can be loaded with discarded iron and/or steel junk (scrap) 70 of various sizes of e.g. up to three or more meters in length, depending on the dimension of the used shredding-system 40. By shredding such huge steel junk (scrap) 70 the shredding-system 40 produces crushed scrap-iron pieces 71 with a preferred length in any direction in space of about 30 cm maximum and segregates high value non-ferrous metals 72.

The shredding-system 40 is driven by an electrical motor 41 which is powered by a power generator 32. The power generator 32 is driven by a steam turbine 31 using steam from at least one recuperative boiler 30, which is located in the exhaust gas system 21 of the dedusting plant 24 of the electric arc furnace 10. Any surplus electrical energy can be directed to other potential consumer loads of the steel production facility 1.

The shredded scrap-iron pieces 71 are directly discharged from the shredding-system 40 and ingested into a receiving scrap-hopper 42 located above ground or underground.

To charge the shredded scrap-iron pieces 71 into the electric arc furnace 10, the operator of a steel production facility 1 can, according to the invention, control the desired feeding quantity and the feed rate by electronic means of control 80. Here, the quantity and feed rate will be depending on the furnace-capacity, on the feed mix and on the capacity of the transformer 12 for the graphite electrodes 11.

A chute 54 preferably of swivelling type is positioned above the furnace-shell 13 of the electric arc furnace 10. This chute 54 is so far the commonly used chute for feeding additives to the furnace 10 via the so called fifth hole 15 in the furnace-roof 14. The furnace designs like furnace size and electrode diameter depend on the performance of the transformer.

With the beginning of an uninterrupted melting process respectively with each new cyclical melting phase, an organization of the material flow has proven its worth as follows: All means of conveyance 50 and 51 start downstream from the view of the furnace 10 to the scrap-hopper 42. The exact number of the means of conveyance (conveyor belts 51 and vibrating feeder 50) depends on the location of scrap-iron supply. First, the conveyor belt 51 next to the swivelling chute 54 is activated, followed by the conveyor belts 51 positioned in front of this conveyor belt. Last activated in the chain will be the vibrating feeders 50 underneath the scrap-hoppers 42, which are preferably controlled by frequency converters.

There are preferably two weighing systems 52 attached to the conveyor belts 51, one of them advantageously positioned at the first conveyor belt 51 directly after the vibrating feeders 50 and the second one at the end of the transportation route at the last conveyor belt 51 before entering into the furnace-roof 14. This configuration ensures a correct measurement and comparison (double-check) of the quantity to be fed into the furnace-shell 13. If the second weighing system 52 is reading the same capacity as the first one 52, no corrective action will be taken on the vibrating feeders 50. In case of a major deviation, a correction can be carried out by means of a computer system 80.

In the case of too coarsely shredded scrap-iron pieces 71, to the conveyor belts 51 can be assigned a segregation apparatus 53, which detects, e.g. optically by means of monitoring cameras, and thus can segregate pieces of scrap-iron that exceed pre-defined dimensions.

In case of an electric arc furnace 10 operating in the cyclical melting process the vibrating feeders 50 stop when the weight reaches the final set point. The scrap conveyors 51 stop a few seconds later.

At least the first conveyor belt 51 coming after the vibrating feeder 50 preferably remains fully loaded with scrap-iron pieces 71, while all other conveyor belts 51 can be emptied or keep feeding other materials, e.g. Direct Reduced Iron (DRI), lime, coke, etc. Keeping a conveyor belt 51 loaded with scrap-iron pieces 71 has the advantage, that the feeding time up to the next melting cycle is minimized. The quantity can be calculated by the computer system 80 of the steel production facility 1.

Alternatively, there is the possibility of charging other materials, rather than scrap-iron pieces, or simultaneously with the same facility and from different sources. These materials, like e.g. lime, coke, Direct Reduced Iron (DRI) and/or pressed Hot Briquette Iron (HBI) are also fed by the last conveyor belt 51, which is equipped with a weighing device 52. Each of the materials is ordered by the operators or by a computerized process control system 80 with a certain feed rate and via another weighing conveyor belt 51, 52 and can be easily subtracted from the total weight measured.

If finally all charge materials are fed to the electric arc furnace 10 that is operated in the cyclical melting process, the conveyor belts 50, 51 are entirely stopped. This applies particularly to the times needed for slag discharge and steel tapping.

The intervals caused by the slag discharge and the steel tapping also cause an interruption of exhausts and consequently of the power generation in such a way that the shredder can temporarily not be driven by the energy generated by the means of power generation. As in those said intervals the input of charge material is also interrupted, this is not further tragic, because, despite those interruptions we have a facility of such energy efficiency as it has not yet existed.

The before mentioned procedure equally applies to cases of interruptions due to machine care of an electrical arc furnace which apart from this runs in an uninterrupted melting process.

Figure 4:
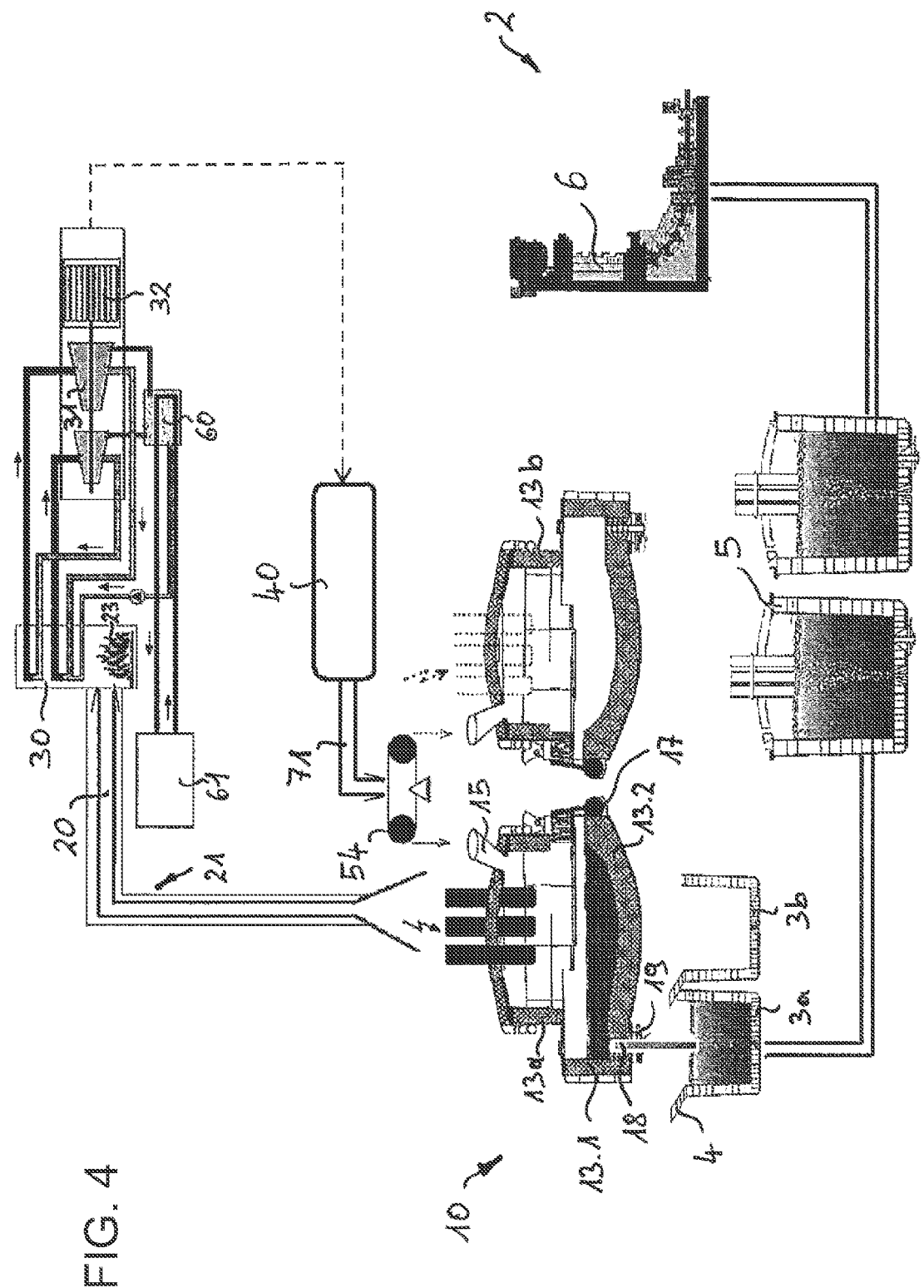
FIG. 4 shows the process flow of a second steel production facility according to claim 7 of the invention together with an uninterrupted melting process and an uninterrupted tapping process simultaneously running thereto.

FIG. 4 shows the process flow of a second steel production facility 1 according to claim 7 of the invention with an uninterrupted melting process and a simultaneously thereto running uninterrupted tapping process.

The electric arc furnace 13 is equipped with an EBT (excentric bottom tapping) 18 facility. Below the steel tap opening 18 a slide or plug system 19 is placed. This system 19 allows to set and control the desired tapping time (ladle filling time or flow rate/speed). The height location of the EBT (balcony) 18 is constructed in such a way that a certain amount of remaining melt is always located below and above the steel tap opening 18. Due to this construction, by tilting back the furnace, fast stops and starts of the flow of steel are possible in case of planned repairs of the furnace. The bath height is preferably computer-controlled by the balance of the feed rate (continuous feeding of the shredder) and tapping amount (position of the slide or plug system 19).

An uninterrupted tapping will be only possible if the charge material is also uninterruptedly added and immediately molten. The bath temperature (furnace melt) is constantly in the desired tapping temperature, which can be regulated and controlled by measurements at any time. The tap volume (crude steel) per time unit corresponds to the melt volume, the added amount, minus the melting loss. In other words: an uninterrupted tapping is only possible because of the balance existing between the charged material (controlled by feed rate) and the needed melting energy (controlled by the electrical power input). This balance can be preferably controlled by a computer 80.

Usually, the feed rate of charged materials like shredded scrap 71 etc. is determined by the energy input (specific feed rate). In the case of a disturbance with the steel ladle 3, at the ladle furnace 5 and/or in the casting machine 6, it is necessary that the steel flow (furnace output) can be reduced. In this case, the energy input is reduced, whereby the scrap flow rate etc. will also slow down. The tapping quantity (flow speed/rate) will also be reduced by changing the position of the slide or plug system 19 of the steel tap opening 18.

The tapping ladle 3a is equipped at its rim with a spout 4, which overlaps the rim of a neighbouring steel ladle 3B, 4, to guaranty a trouble free exchange of the ladles 3a, 3b, . . . under the continuous steel stream.

The capacity of the ladles 3 is designed in such a way that the temperature after filling will be still 30 to 40 degrees below the required casting temperature. Decisive for that are the performance parameters of the furnace 10. During "tapping" (filling of the ladles 3, 3a, 3b, . . . ) some metallurgical treatments like de-sulphurization and alloying can already be carried out. For a fast and continuous operation of the casting machine 6 two ladle furnaces 5 can be available. The casting machine 6 can work with two tundish cars and flying tundish changing procedures.

Since a wear of the tap hole 18, the slide or plug system 19 and the furnace refractory 13.1 can not be prevented, but nevertheless a continuous supply of the continuous casting machine 6 with steel is to be guaranteed, it has proven its worth to provide a second vessel 13b without electrode system (Twin Shell Furnace). This furnace 13b will continue to produce steel, while the other furnace 13a vessel will be repaired or replaced, and then again will be at the disposal as a "Standby" unit. Minor repairs, such as especially the change of the tap opening 18 and/or of the slide or plug system 19, which is due about every other day, can be carried out, if planned in time, by reducing the casting speed and thereby creating a accumulation of steel at the ladle furnace 5. Therefore, the steelmaking will be stopped and the furnace 10 will be tilted into a slag off position with a maximum remaining melt. A tap hole change can be carried out e.g. with an previously prepared tap hole set 18, 19 and takes only 15 to 20 minutes.

The maximum feed rate I of scrap-iron 71 depends on the capacity of the transformer 12. A furnace 13 with a capacity of approximately 150 tonnes of crude steel usually disposes of a power input of 100 MW minimum. In the exemplary case of an assumed electrical energy consumption of 490 kWh/t scrap charge (Assumed Values: Metallic Yield=88%; Arc Utilization=90%; Tapping Temperature=1620° C.), the tapping performance (productivity) arises depending on energy input (without chemical energy) and scrap feed rate as in the following shown in the table:

| Power Input [MW] | Input Scrap-iron (feed rate II) [t/h] | Output Steel (productivity II) [t/h] |
| --- | --- | --- |
| 60 | 121 | 107 |
| 80 | 162 | 143 |
| 100 | 202 | 178 |
| 120 | 243 | 214 |

Figure 5:
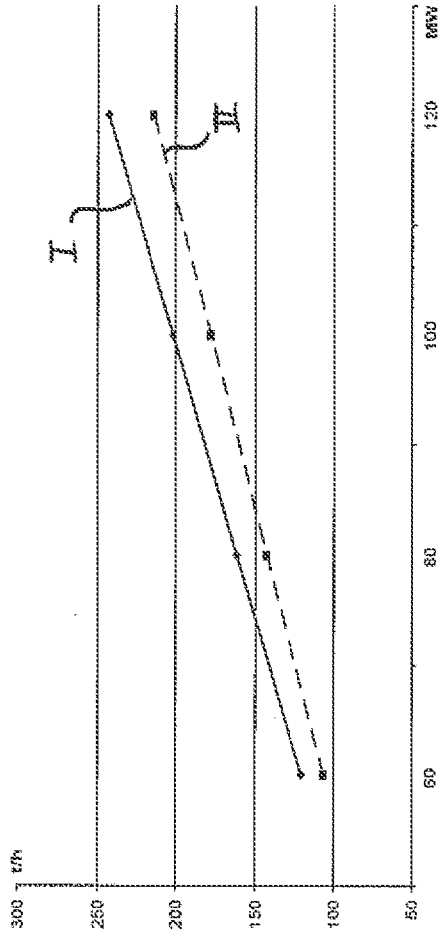
FIG. 5 shows within a diagram the productivity of an electric arc furnace according to the invention depending on energy input (without chemical energy) and scrap feed rate.

FIG. 5 shows the data of the preceding table plotted in a diagram. Therein the productivity II of an electric arc furnace 10 only operated with scrap-iron 71 is illustrated depending on the energy input (without chemical energy) and the scrap feet rate, wherein on the x-axis the power input in megawatt [MW] and on the y-axis the tonnage per hour [t/h] were plotted. Also clearly visible is the balance between Input I of scrap-iron 71 (feed rate) and Output II of steel (productivity).

Figure 6:
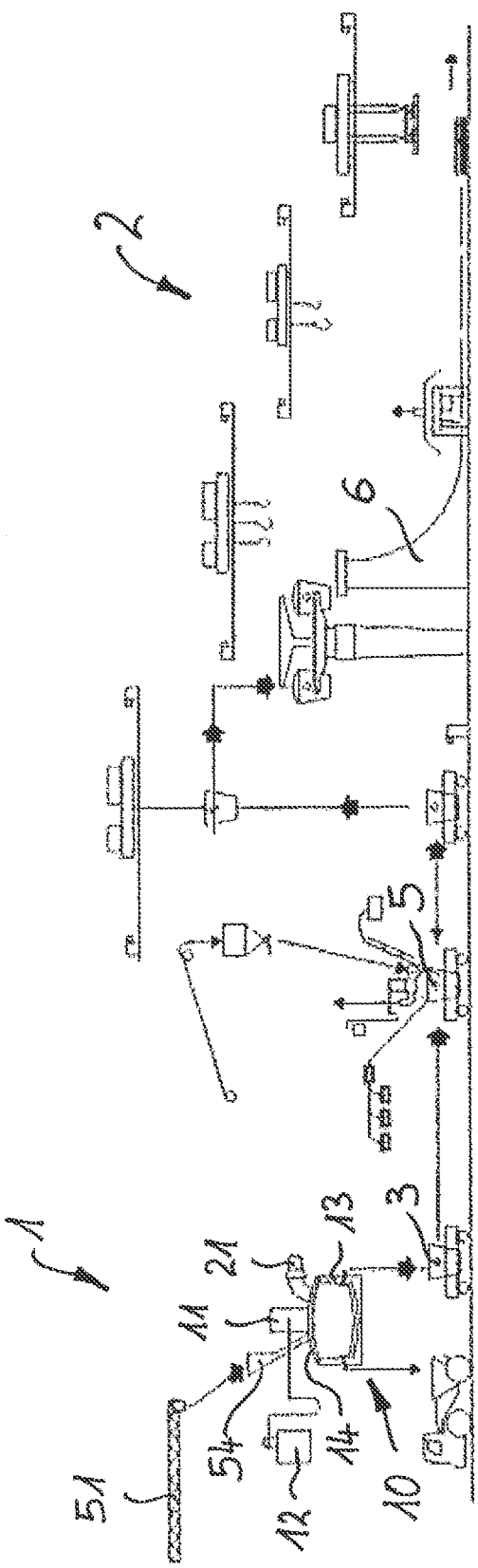
FIG. 6 shows the possible integration of a steel production facility according to the invention into a steel processing plant.

FIG. 6 then, shows the possible integration of a steel production facility 1 according to the invention, corresponding to FIG. 3 or FIG. 4, in a steel processing plant, particularly in a mini-mill 2.

The furnace design thereby can differ from the conventional electric arc furnaces as follows:

Due to the fact that there is uninterruptedly or at least cyclically carried out a continuous addition of charge materials like scrap, the melting bath is always in liquid condition (flat bath process), in this case there is no more need to open the furnace-roof 14 for scrap charging. In this case, the roof lifting device can be eliminated. The furnace-roof 14 can be lifted by the overhead crane wherever required for purpose of repairing or changing. The furnace 10 now consists of not more than only two parts, lower furnace-shell 13 and upper shell (furnace-roof) 14.

The water-cooled panels of furnace-roof 14 and lower furnace-shell 13 can be replaced by refractory material, so that the furnace 10 will be lined only with refractory material. This reduces the dimensioning of the water treatment enormously.

Furthermore the furnace volume will be reduced. The new, smaller furnace volume is determined by the generated gas volume and by the transformer capacity. Depending on the volume of the vessel determined by the size of the transformer; the furnace can be equipped at the bottom with one or more rinsing plugs (not shown). These have the function to guarantee a better homogenization of the bath.

Electric steelmaking technology has been undergoing radical changes during the past decades.

In the past, electric arc furnaces were only fed with 100% scrap charge. Nowadays the charge material being used varies from solid materials, scrap, Direct Reduced Iron (DRI) and/or Hot Briquette Iron (HBI) etc. Especially in times of high steel demand the market prices change frequently and flexibility with regard to charge material is a big advantage from an economic point of view.

The success of ladle treatment for the requirements of normal steel qualities and of secondary treatment of high steel quality has increased the productivity of electric arc furnaces 10, as well as it has influenced the procedures. The typical electric arc furnace procedure with the double slag practice is no more used, so that the cycle of a melting process (tap-to-tap time) of already known electric arc furnaces is coming close to that of an oxygen converter.

With the present steel production facilities 1 according to the invention, that are operated uninterruptedly or at least cyclically, which set new standards in terms of total energy-balance with regard to productivity and energy saving, the trend of the last years is consistently continued.

LIST OF REFERENCE SIGNS 1 steel production facility
2 mini-mill
3, 3a, 3b steel ladles
4 spout of steel ladle 3
5 ladle furnace
6 continuous casting machine
10 electric arc furnace (EAF)
11 graphite electrode
12 transformer
13, 13a, 13b furnace-shell
13.1 wall of the furnace
13.2 bottom of the furnace
14 furnace-roof
15 feeding opening, in particular fifth hole into furnace-roof 14
16 means for creating foamy slag
17 slag discharge opening
18 steel tap opening, in particular excentric bottom tapping (EBT)
19 slide or plug system
20 hot process-exhaust (furnace top)
21 exhaust gas system
22 drop-out-box
23 area of the exhaust gas system 21 with post combustion
24 dedusting plant
30 recuperative boiler
31 steam turbine
32 power generator
40 shredding-system
41 electrical motor
42 above ground or under-ground scrap-hopper
50 vibrating feeder
51 conveyor belt
52 weighing system
53 segregation apparatus
54 swivelling chute
60 condenser
61 water treatment plant (WTP)
62 water
70 different huge discarded iron and/or steel junk (scrap)
71 loose, non-pressed, shredded pieces of scrap-iron
72 high value non-ferrous metals
80 computer based process control system
I Input scrap-iron (feed rate)
II Output steel (productively)

The invention claimed is:

1. A steel production facility, comprising:
an electric arc furnace configured for uninterruptedly melting charge materials comprising shredded scrap-iron pieces, Direct Reduced Iron and/or Hot Briquette Iron and to form therein a steel bath of liquid steel;
said electric arc furnace having a steel tap opening arranged at or near a bottom thereof and wherein a part of the liquid steel is uninterruptedly discharged from the steel bath in said electric arc furnace via said steel tap opening; and
conveying devices configured for uninterruptedly charging charge materials into said electric arc furnace.

2. The steel production facility according to claim 1, wherein said electric arc furnace generates hot process exhaust during the melting of the charge materials, and further comprising:
a power generator for generating power during a melting process from a thermal energy included in the hot process-exhaust of the electric arc furnace;
a shredding-system assigned to said electric arc furnace for shredding discarded iron and/or steel junk and for producing pieces of scrap-iron;
an electric motor driving said shredding system, said electric motor being powered, at least during a melting process cycle, by electric energy recovered by said power generator; and
wherein said conveying devices are configured, during a melting process cycle, for continuously feeding said electric arc furnace with the pieces of scrap-iron shredded by said shredding-system.

3. The steel production facility according to claim 1, wherein said electric arc furnace comprises a furnace-shell of refractory material and/or water cooled elements and a furnace roof that is always closed during a continuous feeding with scrap-iron pieces, and wherein said electric arc furnace is formed with a feed opening in a wall of said furnace shell and/or in said furnace roof, said feeding opening allowing a continuous feed into said electric arc furnace with the pieces of scrap-iron shredded by said shredding system.

4. The steel production facility according to claim 1, wherein said electric arc furnace comprises a furnace-shell dimensioned to provide interior space for 90% only of a maximum amount of shredded scrap-iron pieces in unmelted form that is molten in the course of one cycle of a melting process.

5. The steel production facility according to claim 4, wherein said electric arc furnace is dimensioned for 80% only of the maximum amount of shredded scrap-iron pieces in unmelted form.

6. The steel production facility according to claim 4, wherein said electric arc furnace is dimensioned for 70% only of the maximum amount of shredded scrap-iron pieces in unmelted form.

7. The steel production facility according to claim 1, wherein said electric arc furnace includes means for creating foamy slag in an amount sufficient to at least partially muffle arcs by a foamed slag layer.

8. The steel production facility according to claim 1, wherein said electric arc furnace comprises a furnace shell with a furnace wall and said furnace wall is formed with a slag discharge opening, said slag discharge opening being disposed at a height level defined or definable, in relation to a melting bath, by a slide or plug system, such that an overrun of foamy slag drains off according to an overflow principle, as soon as the melting bath has reached a certain level.

9. The steel production facility according claim 1, which further comprises a first steel ladle having a rim formed with a spout, said spout overlapping a rim of a neighboring, second steel ladle, enabling a trouble-free exchange of the ladles under a continuous steel stream.

10. The steel production facility according to claim 2, which comprises a computer based process control system configured to direct unrestrictedly definable feed rates of scrap-iron pieces, such that charged materials are in balance with a required melting energy.

11. The steel production facility according to claim 1, wherein said conveying devices include at least one weighing system for determining an actual feed rate of scrap-iron.

12. The steel production facility according to claim 1, wherein said conveying devices include a segregation apparatus configured for detecting and segregating pieces of scrap-iron that exceed pre-defined dimensions.

13. The steel production facility according to claim 12, wherein said segregation apparatus is configured for detecting pieces of scrap-iron by optical monitoring.

14. The steel production facility according to claim 2, which comprises a recuperative boiler disposed to recover the electric energy from the hot process exhaust.

15. The steel production facility according to claim 1, wherein said electric arc furnace is selected from the group consisting of an alternating current electric arc furnace and a direct current electric arc furnace.

* * * * *